D. C. HANSEN.
DRIER.
APPLICATION FILED OCT. 25, 1920.
1,434,008.
Patented Oct. 31, 1922.
3 SHEETS—SHEET 1.
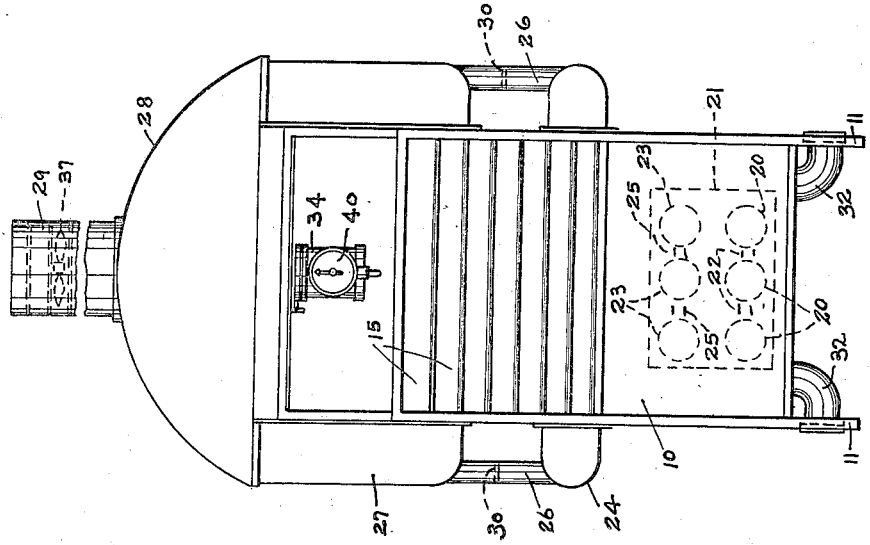
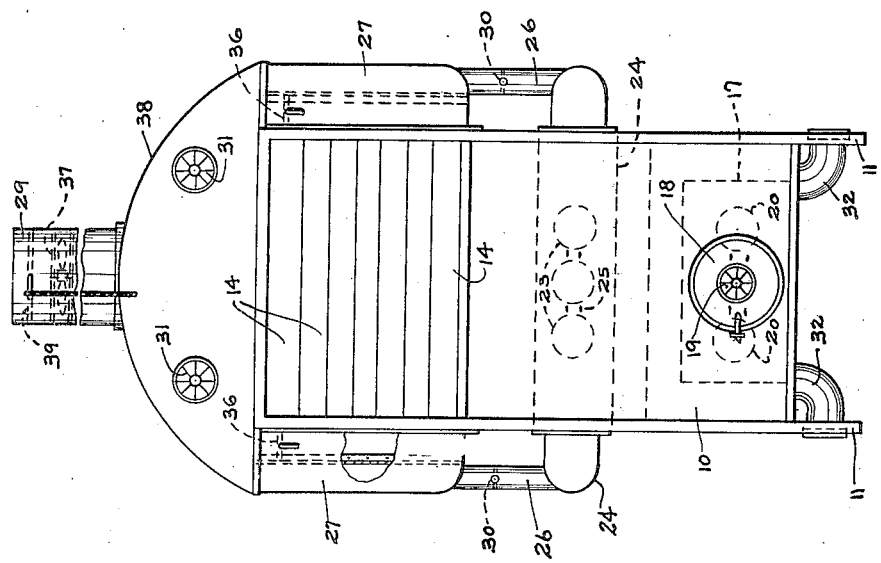
Witnesses:
Inventor
Dethlef C. Hansen
By his Attorney D. C. HANSEN.
DRIER.
APPLICATION FILED OCT. 25, 1920.
1,434,008.
Patented Oct. 31, 1922.
3 SHEETS—SHEET 2.
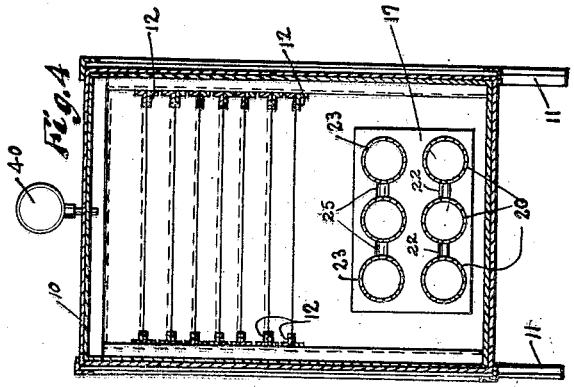
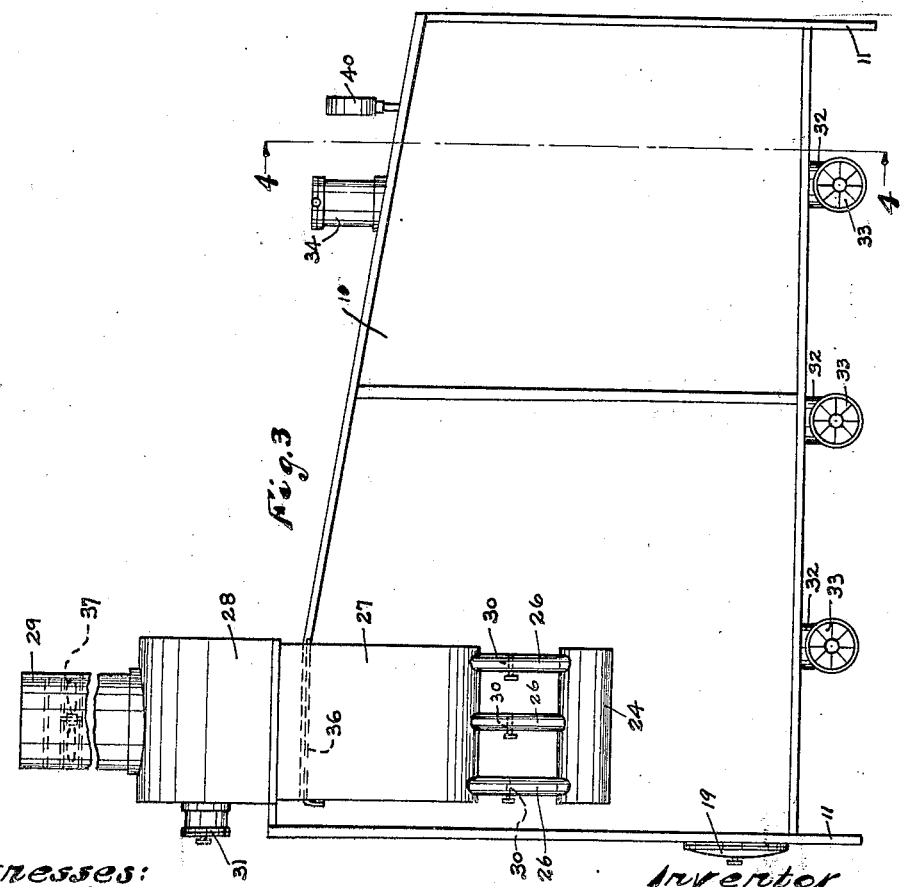
Witnesses:
Inventor
Dethlef C. Hansen
By his Attorney

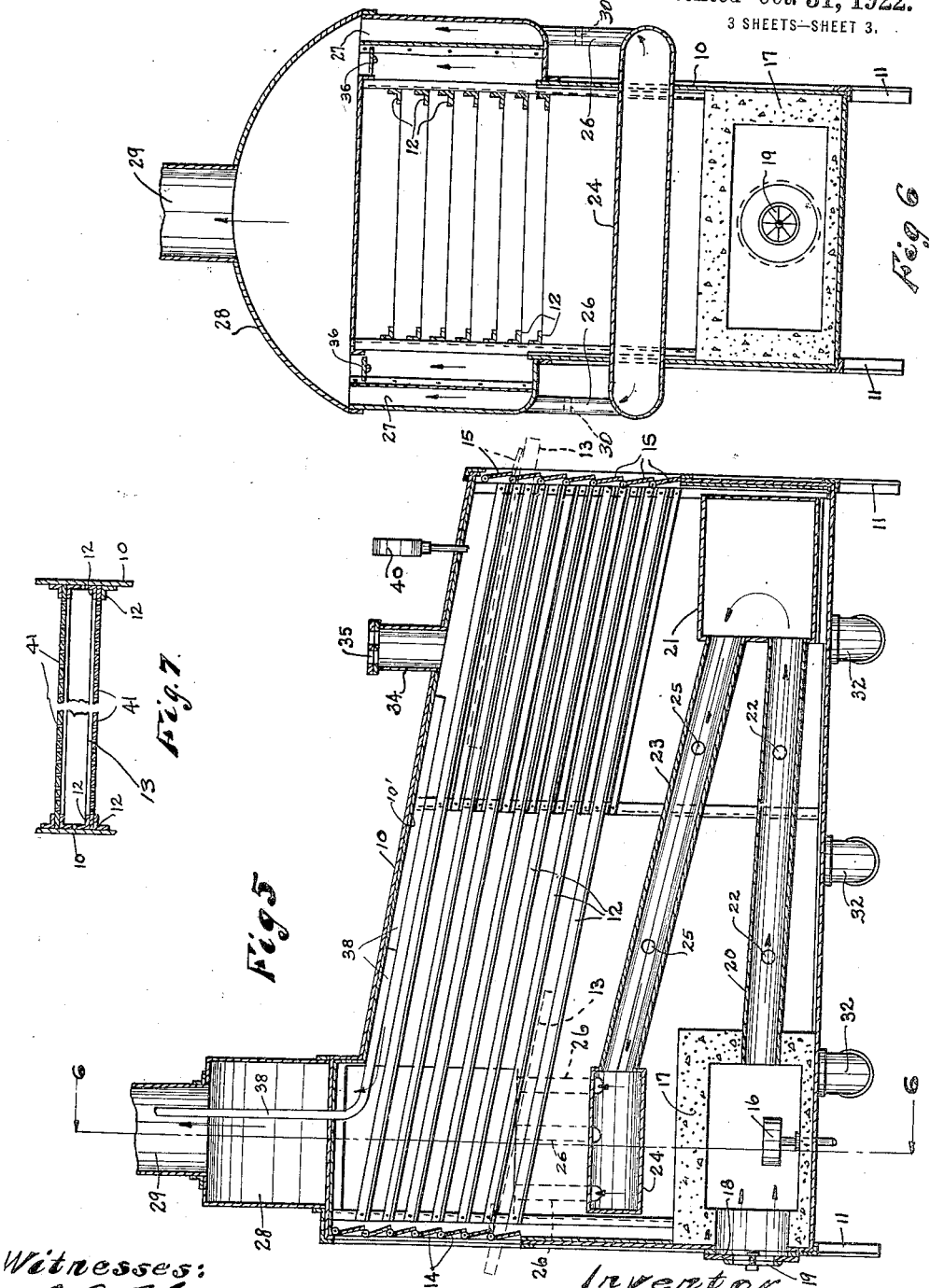

Patented Oct. 31, 1922.

1,434,008

UNITED STATES PATENT OFFICE.

DETHLEF C. HANSEN, OF CHICAGO, ILLINOIS.

DRIER.

Application filed October 25, 1920. Serial No. 419,377.

*To all whom it may concern:*

Be it known that I, DETHLEF C. HANSEN, a citizen of the United States, and a resident of the city of Chicago, county of Cook, and State of Illinois, have invented certain new and useful Improvements in Driers, of which the following is a specification.

My invention relates to driers and it has for its principal object the provision of a new and improved arrangement of parts by virtue of which a better control and manipulation of the heat may be effected within the drier and by which a better and freer circulation may be effected of the air within the drying chamber for carrying away the moisture as it is released during the drying treatment.

Other objects will appear hereinafter.

The invention consists in the combination and arrangement of parts hereinafter described and claimed.

The invention will be best understood by reference to the accompanying drawings forming a part of this specification, and in which, Fig. 1 is a front view of my improved drier;

Fig. 2 is a rear view of the drier;

Fig. 3 is a side view of the drier;

Fig. 4 is a cross section taken at line 4—4 of Fig. 3;

Fig. 5 is a central vertical section through my improved drier;

Fig. 6 is a cross section taken at line 6—6 of Fig. 5; and

Fig. 7 is a fragmentary detailed view of a part of the structure as shown in Fig. 6, showing a modified form of construction.

Referring to Figs. 1 to 6 inclusive, 10 indicates a housing mounted upon supporting legs 11. The housing is preferably formed of sheet-metal upon a suitable frame-work, being lined with asbestos 10′ or other suitable heat resisting material as is best shown in Fig. 5. The housing 10 is higher at its front end portion than at the rear end, and is provided with inclined angle iron supports 12 at opposite sides for supporting trays 13 in position in the upper part of the chamber enclosed by the housing 10. Means is provided for heating the interior of the housing 10, and provision is made for a circulation of air through the chamber whereby the moisture contained by a product mounted upon trays 13 in position in the chamber will be released from the products and carried out by the currents of air escaping from the chamber as hereinafter described. As is best shown in Fig. 5, the front end wall of the housing opposite the strips 12 is formed by a plurality of inwardly opening doors 14 so arranged as to be displaced by trays being pushed into position as is shown at the left hand side of Fig. 5. At the rear end, the wall of the chamber is in the form of outwardly opening doors 15 which are adapted to yield to permit the trays 13 to slide rearwardly from the chamber as is shown by dotted lines at the right hand side of Fig. 5. In practice, the drying chamber will be kept filled with trays during the drying process, the trays at the rear end of the chamber being pushed rearwardly out of position by contact with fresh trays being inserted into position from the front.

In the construction shown the drying chamber is heated by means of a burner 16 of any suitable type within a fire-box 17 which is formed of concrete. The front end of the fire-box is closed by a door 18 equipped with a damper 19 of any approved type by which the admission of air to the fire-box is controlled. Extending rearwardly from the fire-box 17, there are a plurality of pipes 20 which communicate at their rear ends with a heat chamber 21, transversely extending pipes 22 being mounted between the pipes 20 at intervals therealong. Longitudinally extending pipes 23 extend forwardly from the heat chamber 21 to a second heat chamber 24 at the forward end of the chamber 10 directly above the fire-box 17. The pipes 23 are also connected by laterally extending pipes 25 by which the circulation of the hot air and the products of combustion from the fire-box 17 is encouraged through the chamber 10. As is best shown in Fig. 6 the heat chamber 24 extends laterally beyond the sides of the housing 10, being connected at its outer ends by means of vertically disposed pipes 26 with vertically disposed conduits 27 which open at their upper ends into a hood 28 from which a flue or stack 29 rises. Each of the pipes 26 is provided with a damper 30 for controlling the flow of the hot air therethrough. The hood 28 is provided on its front face with dampers 31 of any approved type for controlling the admission of air to the hood as may be desired.

Improved means is provided for controlling the admission of air to the chamber and for controlling the circulation of air therethrough. As will be readily understood, when the burner 16 is provided with suitable fuel for heating the fire-box 17, the hot air and the products of combustion will be drawn rearwardly through the pipe 20 to the heat chamber 21, thence forwardly through the pipes 23 to the heat chamber 24, thence upwardly through the pipes 26 and the conduits 27 to the hood 28 from which they escape through the stack 29. As a consequence of the circulation of the hot air through the system of piping as above described within the chamber 10, the air within the chamber 10 becomes heated and is caused to rise and to circulate between and about the trays 13 in position upon the supports 12. For controlling the temperature of one portion of the chamber 10 with respect to another, a series of air inlets 32 are provided at each side of the housing at the lower portion thereof, such air inlets being provided with suitable valves or dampers 33 for controlling the admission of air therethrough. As another means for controlling the temperature of the air within the chamber 10 a short stack 34 is provided communicating with the chamber near the rear end thereof, being provided with a valve or damper 35 on its upper end. As is best shown in Fig. 6, the chamber 10 communicates with the interior of the hood 28 at both sides, dampers 36 being provided for controlling the flow of the air from the chamber 10 into the hood 28.

For assisting in the circulation of the air through the drying chamber 10, I have provided a fan 37 of a propeller type mounted revolubly within the stack 29. This fan is mounted so as to be free to rotate under the influence of the hot air and the products of combustion escaping through the stack from the passage-ways 27. By reason of the rotation of the fan 37, a suction is exerted upon the chamber 10 serving to draw the air therefrom for discharge through the stack. It will be understood that as the air within the chamber 10 becomes heated and receives the moisture released from the products being dried such air will escape through the stack 29 independently of the fan 37, but by the use of the fan the circulation of the air in this manner is encouraged and made more brisk. In order to have the fan 37 effective at certain definite points within the chamber 10 for drawing the air therethrough, I have provided a plurality of pipes 38 which open at their upper ends directly underneath the fan 37 and open at their other ends at suitable points within the chamber. A damper 39 is also provided within the stack 29, as is best shown in Fig. 1. A thermometer 40 of any suitable type is mounted upon the housing near its rear end.

By the use of my construction as above described, complete control may be had of the hot air passing through the system of piping. By the use of the dampers for controlling the inlet and outlet of the air from the chamber 10, the circulation of the air through the chamber 10 can also be controlled to a very high degree.

Referring now to Fig. 7, 41 indicates a series of perforated plates interposed between the trays 13, suitable supports for such plates being provided. By the use of the plates 41, additional means is provided for controlling the circulation of the air through the chamber.

By the use of my construction in which reliance is placed more upon an effective circulation of the air through the drying chamber for carrying away the moisture than upon any high degree of heat, an effective drying is effected without materially changing the flavor of the product. It has also been found in practice that a much more satisfactory drying process can be carried out by the use of a number of unit driers such as I have illustrated than by the use of a large drying house of an equal capacity, by reason of the increased ease of control in the use of the smaller units.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A drier comprising a drying chamber, a fire-box in the lower portion of said chamber, longitudinally extending pipes for carrying the products of combustion from said fire-box to various heat chambers in different locations, and transversely extending pipes connecting said longitudinally extending pipes at their intermediate portions for effecting a circulation of heat therethrough, substantially as described.

2. A drier comprising a drying chamber, a fire-box in the lower portion of said chamber at the forward end thereof, a heat chamber in the lower portion of the drying chamber at the rear end thereof, a heat chamber disposed above said fire-box, a plurality of longitudinally extending pipes connecting said fire-box with said first-mentioned heat chamber, other longitudinally extending pipes extending forwardly from said heat chamber for conducting the products of combustion through said second-mentioned heat chamber therethrough from the fire-box, and pipes extending between said longitudinally extending pipes for effecting the circulation of heat therethrough, substantially as described.

3. A drier comprising a drying chamber, a fire-box in the lower portion of said chamber at the forward end thereof, a heat chamber in the lower portion of the drying chamber at the rear end thereof, a heat chamber disposed above said fire-box, a plurality of longitudinally extending pipes connecting said fire-box with said first-mentioned heat chamber, other longitudinally extending pipes extending forwardly from said heat chamber for conducting the products of combustion through said second-mentioned heat chamber from the fire-box, and transversely extending pipes between said longitudinally extending pipes for effecting a circulation of heat therethrough, substantially as described.

4. A drier comprising a drying chamber, a fire-box in said chamber, a vertically disposed stack rising from said chamber, a heat chamber below said stack, pipes connecting said fire-box with said heat chamber, a plurality of vertically disposed pipes connecting said heat chamber with the lower portion of said stack, and dampers in each of said vertically disposed pipes for controlling the flow of the products of combustion through said pipes, substantially as described.

5. A drier comprising a drying chamber, a system of piping for circulating hot air through said chamber but shut off completely from the chamber, means for supporting drying trays in said chamber, a series of air inlet pipes arranged along both sides of the chamber at its lower edge, and dampers in each of said inlet pipes for controlling the entrance of air therethrough independently of the remaining parts, substantially as described.

6. A drier comprising a drying chamber, a system of piping for circulating hot air through said chamber but shut off completely from the chamber, means for supporting drying trays in said chamber, a stack rising from said chamber at one end for producing a circulation of air through the chamber, and an outlet opening from the upper portion of said chamber near the opposite end thereof, substantially as described.

7. A drier comprising a drying chamber, a system of piping for circulating hot air through said chamber but shut off completely from the chamber, means for supporting drying trays in said chamber, a stack rising from said chamber at one end for producing a circulation of air through the chamber, damper means for controlling the escape of air from said chamber through said stack, an outlet opening from the upper portion of said chamber near the opposite end thereof, and a damper for controlling the escape of air from said chamber through said outlet opening, substantially as described.

8. A drier comprising a drying chamber, a system of piping for circulating hot air through said chamber but shut off completely from the chamber, means for supporting drying trays in said chamber, a stack rising from said chamber at one end and communicating both with said system of piping and with said chamber serving to induce a circulation of air through the chamber, a second stack rising from said chamber at the opposite end, and damper means for controlling the escape of air through both of said stacks, substantially as described.

9. A drier comprising a drying chamber, a system of piping for circulating hot air through said chamber but shut off completely from the chamber, means for supporting drying trays in said chamber, a stack rising from said chamber at one end and communicating both with said system of piping and with said chamber serving to induce a circulation of air through the chamber, a second stack rising from said chamber at the opposite end, damper means for controlling the escape of air from said piping through said first named stack, other damper means for controlling the escape of air from said chamber through said first named stack, and other damper means for controlling the escape of air from said chamber through said second stack, substantially as described.

10. A drier comprising a drying chamber, a system of piping for circulating hot air through said chamber but shut off completely from the chamber, means for supporting drying trays in said chamber, an outlet opening from said chamber communicating both with said system of piping and with said chamber, and a fan in said outlet opening adapted to be driven by the air escaping from said system of piping and adapted to exert a suction on said chamber for producing a circulation of air therethrough, substantially as described.

11. A drier comprising a drying chamber, a system of piping for circulating hot air through said chamber but shut off completely from the chamber, means for supporting drying trays in said chamber, an outlet opening from said chamber communicating both with said system of piping and with said chamber, and a fan of the propeller type revolubly mounted in said outlet opening adapted to be driven by the air escaping from said system of piping and adapted to exert a suction on said chamber for producing a circulation of air therethrough, substantially as described.

12. A drier comprising a drying chamber, a system of piping for circulating hot air through said chamber but shut off completely from the chamber, means for supporting drying trays in said chamber, a stack rising from said chamber at one end and communicating both with said system of piping and with said chamber, and a fan of the propeller type revolubly mounted in said stack, substantially as described.

13. A drier comprising a drying chamber, a system of piping for circulating hot air through said chamber but shut off completely from the chamber, means for supporting drying trays in said chamber, a stack rising from said chamber at one end and communicating both with said system of piping and with said chamber, a fan of the propeller type revolubly mounted in said stack, and damper means for controlling the escape of air through said stack, substantially as described.

14. A drier comprising a drying chamber, a system of piping for circulating hot air through said chamber but shut off completely from the chamber, means for supporting drying trays in said chamber, a stack rising from said chamber at one end and communicating both with said system of piping and with said chamber, a fan of the propeller type revolubly mounted in said stack, damper means for controlling the escape of air from said system of piping through said stack, and independently operating damper means for controlling the escape of air from said chamber through said stack, substantially as described.

15. A drier comprising a drying chamber, a system of piping for circulating hot air through said chamber but shut off completely from the chamber, means for supporting drying trays in said chamber, and perforated plates interposed between said trays for evenly distributing the air through said chamber, substantially as described.

In testimony whereof I have signed my name to this specification in the presence of two subscribing witnesses.

DETHLEF C. HANSEN.

Witnesses:
 CLARENCE E. THREEDY,
 W. H. DE BUSK.